(12) United States Patent
Roh

(10) Patent No.: US 11,768,918 B2
(45) Date of Patent: Sep. 26, 2023

(54) AUTOMOTIVE SENSOR INTEGRATION MODULE

(71) Applicant: HYUNDAI MOBIS CO., LTD., Seoul (KR)

(72) Inventor: Hee Chang Roh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 779 days.

(21) Appl. No.: 16/726,689

(22) Filed: Dec. 24, 2019

(65) Prior Publication Data

US 2021/0124037 A1    Apr. 29, 2021

(30) Foreign Application Priority Data

Oct. 25, 2019    (KR) .......................... 10-2019-0134008

(51) Int. Cl.
| | | |
|---|---|---|
| *G06F 18/25* | (2023.01) | |
| *G01S 13/86* | (2006.01) | |
| *G01S 17/86* | (2020.01) | |
| *G01S 17/87* | (2020.01) | |
| *G06V 20/58* | (2022.01) | |
| *H04Q 9/04* | (2006.01) | |
| *H04L 67/12* | (2022.01) | |

(52) U.S. Cl.
CPC ............ *G06F 18/25* (2023.01); *G01S 13/865* (2013.01); *G01S 13/867* (2013.01); *G01S 17/86* (2020.01); *G01S 17/87* (2013.01); *G06V 20/58* (2022.01); *H04L 67/12* (2013.01); *H04Q 9/04* (2013.01); *H04Q 2209/84* (2013.01)

(58) Field of Classification Search
CPC ...... G01S 13/865; G01S 13/867; G01S 17/86; G01S 17/931; G06K 9/6288; G06V 20/58; H04L 67/12; H04Q 2209/84; H04Q 9/04
See application file for complete search history.

(56) References Cited

U.S. PATENT DOCUMENTS 10,906,536 B2 *   2/2021   Smith ................... G01S 17/89
2016/0129789 A1    5/2016   Halford et al.
2016/0327948 A1 * 11/2016   Taguchi ............. G05D 1/0278
(Continued)

FOREIGN PATENT DOCUMENTS

| JP | 2020052909 A | * | 4/2020 |
|---|---|---|---|
| KR | 10-2016-0013736 | | 2/2016 |
| KR | 10-2019-0065043 | | 6/2019 |

OTHER PUBLICATIONS

Robin Heinzler et al., "Weather Influence and Classification with Automotive Lidar Sensors", Jun. 9-12, 2019, 2019 IEEE Intelligent Vehicles Symposium (IV), pp. 1527-1534 (8 pages) (Year: 2019).*
(Continued)

*Primary Examiner* — Christopher S Kelley
*Assistant Examiner* — Asmamaw G Tarko
(74) *Attorney, Agent, or Firm* — H.C. Park & Associates, PLC

(57) ABSTRACT

An automotive sensor integration module including a plurality of sensors differing from each other in at least one of a sensing cycle or an output data format, and a signal processor for selecting a plurality of weights for each of the plurality of sensors on the basis of external environment data, and applying the plurality of weights to a plurality of detection data output from the plurality of sensors respectively to generate a plurality of weighted data.

13 Claims, 6 Drawing Sheets

(56) References Cited

U.S. PATENT DOCUMENTS

| | | | |
|---|---|---|---|
| 2019/0050692 A1* | 2/2019 | Sharma | G06V 20/58 |
| 2019/0248347 A1* | 8/2019 | Kim | B60W 30/0956 |
| 2020/0293796 A1* | 9/2020 | Sajjadi Mohammadabadi | G06V 20/56 |
| 2021/0110217 A1* | 4/2021 | Gunel | H04N 5/23238 |
| 2021/0125010 A1* | 4/2021 | Kim | G06V 10/98 |
| 2021/0271259 A1* | 9/2021 | Karpathy | G06K 9/627 |
| 2021/0309124 A1* | 10/2021 | Fields | B60W 30/095 |

OTHER PUBLICATIONS

Korean Office Action dated Jun. 30, 2023, in Korean Patent Application No. 10-2019-0134008.

* cited by examiner

AUTOMOTIVE SENSOR INTEGRATION MODULE

CROSS-REFERENCE TO RELATED APPLICATION

This application claims priority from and the benefit of a Korean Patent Application No. 10-2019-0134008, filed on Oct. 25, 2019, which is hereby incorporated by reference for all purposes as if set forth herein.

BACKGROUND

Field

Exemplary embodiments relate to an automotive sensor integration module.

Discussion of the Background

As technology becomes more advanced, various sensors, electronic devices, and the like are also provided in a vehicle for user convenience. In particular, research on an advanced driver assistance system (ADAS) has been actively conducted for users' driving convenience. Furthermore, the development of autonomous vehicles is actively under way.

The ADAS and the autonomous vehicles require a large number of sensors and electronic devices to identify objects outside a vehicle.

Referring to FIG. 1, in order to detect objects in front of a vehicle, a camera, a lidar, a radar sensor, etc. are disposed in front of the vehicle, but are disposed at different positions respectively.

Although objects should be identified on the basis of detection results detected by sensors at the same timing in order to improve performance in detecting objects, it is not easy to synchronize object detection sensors because the sensors are disposed at different positions.

In addition, unfiltered detection data from a plurality of sensors are used to identify an object, thereby making it difficult to identify the object.

The above information disclosed in this Background section is only for enhancement of understanding of the background of the invention and, therefore, it may contain information that does not constitute prior art.

SUMMARY

Exemplary embodiments of the present invention provide an automotive sensor integration module in which a plurality of synchronized sensors are arranged.

The inventive concepts are not limited to the above-mentioned exemplary embodiments, and other aspects and advantages of the present invention, which are not mentioned, will be understood through the following description, and will become apparent from the embodiments of the present invention. Furthermore, it will be understood that aspects and advantages of the present invention can be achieved by the means set forth in the claims and combinations thereof.

Accordingly, an aspect of the present invention is to provide an automotive sensor integration module including a plurality of sensors different in at least one of a sensing cycle or an output data format, and a signal processor selecting a plurality of weights for each of the plurality of sensors on the basis of external environment data and applying the plurality of weights to a plurality of detection data output from the plurality of sensors respectively to generate a plurality of weighted data.

Another aspect of the present invention is to provide an automotive sensor integration module including a plurality of sensors different in at least one of a sensing cycle or an output data format, and a signal processor for selecting a plurality of weights for each of the plurality of sensors on the basis of recognition data and applying the plurality of weights to a plurality of detection data output from the plurality of sensors respectively to generate a plurality of weighted data.

Another aspect of the present invention is to provide an automotive sensor integration module including a plurality of sensors different in at least one of a sensing cycle or an output data format, and a signal processor selecting a plurality of weights for each of the plurality of sensors on the basis of at least one of external environment data and recognition data and applying the plurality of weights to a plurality of detection data output from the plurality of sensors respectively to generate a plurality of weighted data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
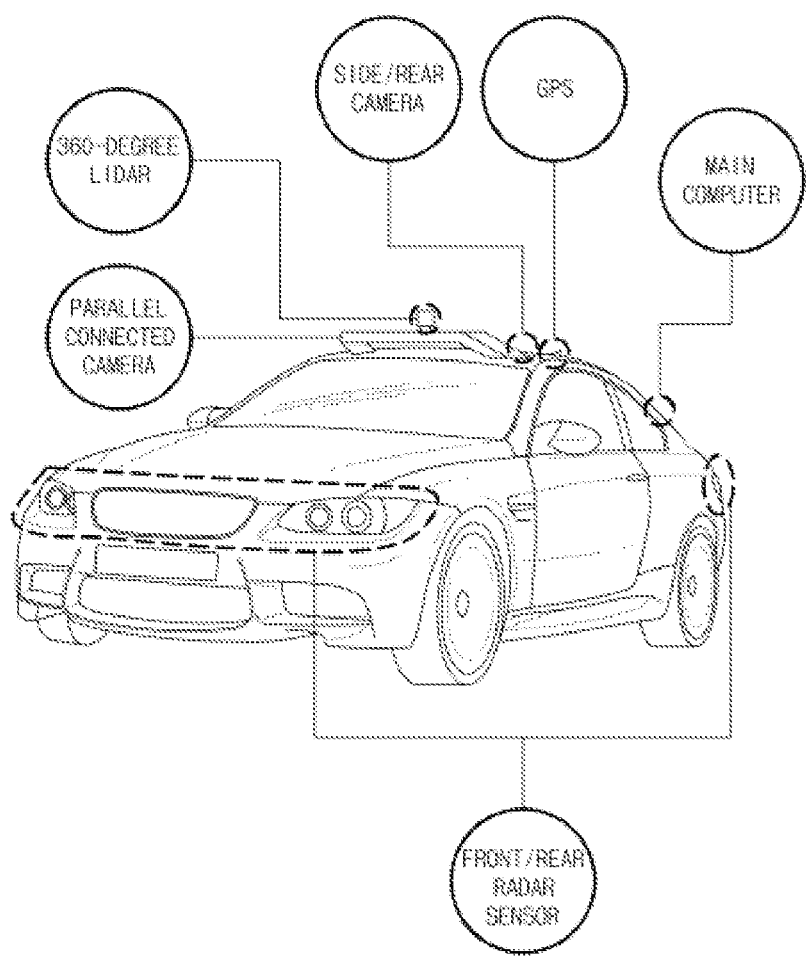
FIG. 1 is a view illustrating the exterior appearance of an autonomous vehicle.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

When a certain element is referred to as being "on (or under)" another element, the certain element may be disposed in contact with the upper surface (or lower surface) of the other element or an intervening element may be present between the other element and the certain element disposed on (or under) the other element.

Furthermore, it will be understood that when a certain element is referred to as being "connected to" or "coupled to" another element, these elements may be directly connected or coupled to each other, but an intervening element may be "interposed" therebetween, or the elements may be connected or coupled to each other via another element. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
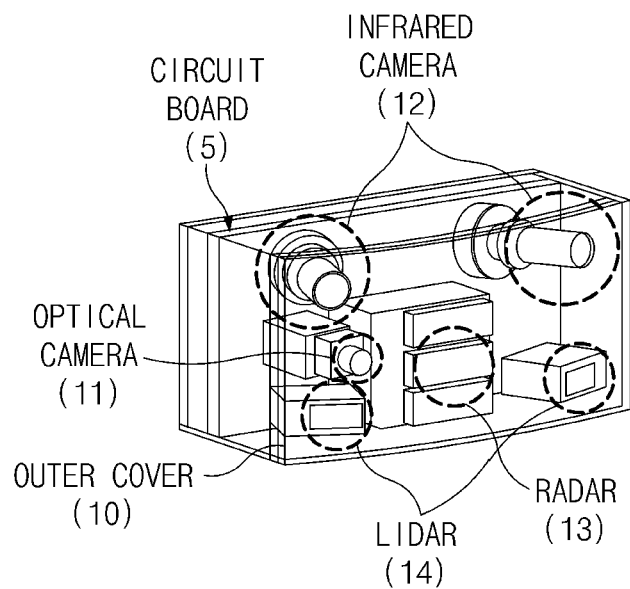
FIG. 2 is a view illustrating an outside view of an automotive sensor integration module according to an exemplary embodiment of the present invention.

FIG. 2 is an outside view of an automotive sensor integration module according to an exemplary embodiment of the present invention.

An automotive sensor integration module according to an exemplary embodiment of the present invention may include a plurality of devices and sensors for detecting objects outside a vehicle to acquire safety information related to vehicle driving. In this case, the objects may include a lane, another vehicle, a pedestrian, a two-wheeled vehicle, a traffic signal, light, a road, a structure, a speed bump, a geographical feature, an animal, etc.

The lane may be a driving lane, a lane next to the driving lane, or a lane along which an opposite vehicle travels. The lane may include left and right lines forming a lane.

Another vehicle may be a vehicle that is travelling in the vicinity of a host vehicle. The other vehicle may be a vehicle within a predetermined distance from the host vehicle. For example, the other vehicle may be a vehicle that is located within a predetermined distance from the host vehicle and precedes or follows the host vehicle.

The pedestrian may be a person in the vicinity of a host vehicle. The pedestrian may be a person located within a predetermined distance from the host vehicle. For example, the pedestrian may be a person on a sidewalk or the roadway within a predetermined distance from the host vehicle.

The two-wheeled vehicle may be a vehicle that is located in the vicinity of a host vehicle and moves using two wheels. The two-wheeled vehicle may be a vehicle that has two wheels and is located within a predetermined distance from the host vehicle. For example, the two-wheeled vehicle may include a motorcycle or a bicycle on a sidewalk or the roadway within a predetermined distance from the vehicle.

The traffic signal may include a traffic light, a traffic sign, a pattern, or text drawn on a road surface.

The light may include light from a lamp in another vehicle, light from a street lamp, or light emitted from the sun.

The road may include a road surface, a curve, and a slope such as an upward slope or a downward slope.

The structure may be an object which is located around the road and fixed onto the ground. For example, the structure may include a streetlight, a roadside tree, a building, a power pole, a traffic light, a bridge, etc.

The geographical feature may include a mountain, a hill, etc.

Meanwhile, the objects may be classified into a moving object and a stationary object. For example, the moving object may conceptually include another vehicle, a two-wheeled vehicle, a pedestrian, etc., while the stationary object may conceptually include a traffic signal, a road, a structure, etc.

As such, it may be desirable to use various sensors and devices to accurately identify various objects around a vehicle.

In order to accurately identify objects outside a vehicle, an automotive sensor integration module according to an exemplary embodiment of the present invention may include a plurality of different types of sensors and devices. In addition, the automotive sensor integration module according to an exemplary embodiment of the present invention may include at least one sensor and device of the same type.

Figure 3:
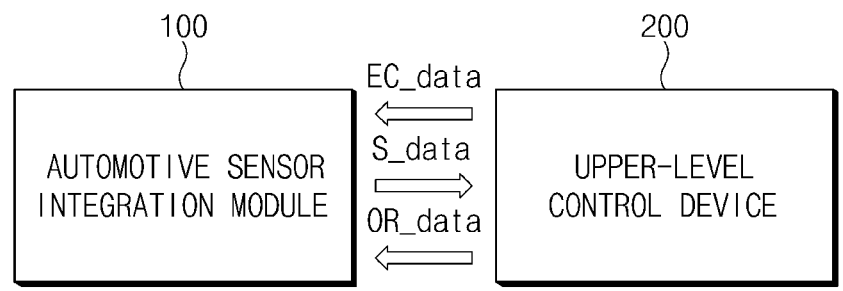
FIG. 3 is a view illustrating a configuration of a vehicle in which an automotive sensor integration module according to an exemplary embodiment of the present invention is disposed.
Figure 4:
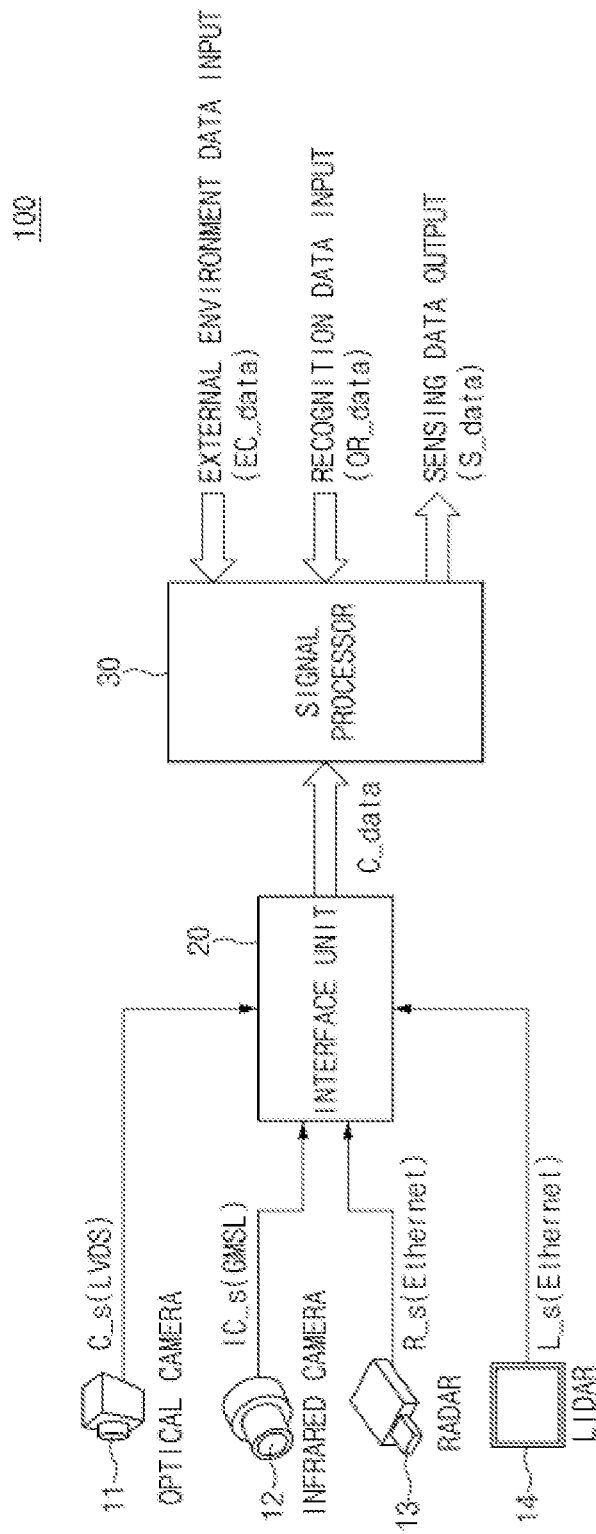
FIG. 4 is a view illustrating a configuration of an automotive sensor integration module according to an exemplary embodiment of the present invention.

Referring to FIGS. 2-4, an automotive sensor integration module 100 according to an exemplary embodiment of the present invention may include an infrared camera 12, an optical camera 11, a lidar 14, and a radar 13 as a sensor to identify an object outside a vehicle, but the inventive concepts are not limited thereto. In addition, the automotive sensor integration module 100 according to an exemplary embodiment of the present invention illustrated in FIG. 2 shows two infrared cameras 12, one optical camera 11, two lidars 14, and one radar 13, but the number of each sensor is suggested only for illustrative purposes and is the inventive concepts are not limited thereto.

Referring to FIGS. 2-4, the automotive sensor integration module 100 according to an exemplary embodiment of the present invention may include a circuit board, an infrared camera 12, an optical camera 11, a radar 13, and a lidar 14. For example, the automotive sensor integration module 100 according to an exemplary embodiment of the present invention may include a circuit board on which an infrared camera 12, an optical camera 11, a radar 13, and a lidar 14 are disposed and mounted.

The optical camera 11 designed to acquire outside images of a vehicle through light and recognize objects, light, and people around, e.g., within a predetermined distance from, the vehicle may include a mono camera, a stereo camera, an around-view monitoring (AVM) camera, or a 360-degree camera. The optical camera 11 has advantages of being able to detect colors and accurately classify objects compared to other sensors, but has a disadvantage of being affected by environmental factors, such as darkness, backlight, snow, rain, fog, etc.

The radar 13 may detect an object on the basis of a time of flight (TOF) method or a phase-shift method through electromagnetic waves, and detect the location of a detected object, the distance to the detected object, and the relative speed. The radar 13 has an advantage of being capable of long distance detection without being affected by environmental factors, such as darkness, snow, rain, fog, etc., but has a disadvantage of failing to detect an object, made of an electromagnetic wave-absorbing material, for example, a steel structure such as a tunnel or a guardrail, and thus being unable to classify objects.

The lidar 14 may detect an object on the basis of a TOF method or a phase-shift method through laser light, and detect the location of a detected object, the distance to the detected object, and the relative speed. The lidar has advantages of being less affected by environmental factors such as darkness, snow, rain, fog, etc., efficient in long- and short-distance detection due to high resolution, and objects are able to be simply classified, but has a disadvantage of failing to measure the speed of objects immediately.

The infrared camera 12 may acquire outside images of a vehicle through the use of infrared rays. In particular, the infrared camera 12 may acquire outside images of the vehicle even in darkness at night. The infrared camera 12 has advantages of being capable of long distance detection and being capable of distinguishing living things from objects without being affected by environmental factors such as night, snow, rain, fog, etc. but has a disadvantage of being pricy.

The automotive sensor integration module 100 according to an exemplary embodiment of the present invention is configured such that an outer cover is coupled in the direction of the detection area of an optical camera 11, an infrared camera 12, a radar 13, and a lidar 14, that is, to the front surface of the automotive sensor integration module 100 to thereby protect the optical camera 11, the infrared camera 12, the radar 13, and the lidar 14 from physical shocks.

As such, in order to accurately classify and identify external objects around a vehicle regardless of environmental factors, the advantages and disadvantages of each sensor must be combined. Therefore, the automotive sensor integration module according to an exemplary embodiment of the present invention discloses a structure in which a plurality of different sensors are all disposed and mounted on a circuit board. In addition, the automotive sensor integration module 100 according to an exemplary embodiment of the present invention may synchronize and output detection results of a plurality of sensors having different operation cycles, thereby having an advantage of classifying and identifying objects more accurately.

FIG. 3 is a view illustrating a configuration of a vehicle in which an automotive sensor integration module 100 according to an exemplary embodiment of the present invention is disposed.

A vehicle in which an automotive sensor integration module 100 according to an exemplary embodiment of the present invention is disposed may further include an upper-level control device 200.

Referring to FIG. 3, the vehicle may include the automotive sensor integration module 100 and the upper-level control device 200.

The automotive sensor integration module 100 may synchronize detection data acquired from each sensor to provide the resultant data as sensing data S_data to the upper-level control device 200. In this case, the automotive sensor integration module 100 weights each of the detection data on the basis of detection data, external environment data EC_data, and recognition data OR_data acquired from each sensor, and provides the weighted detection data as the sensing data S_data to the upper-level control device 200.

The upper-level control device 200 may provide the external environment data EC_data and the recognition data OR_data to the automotive sensor integration module 100. The external environment data EC_data may include at least one among weather, road conditions, temperature, and humidity. The recognition data OR_data may include a result of identifying, by the upper-level control device 200, objects outside the vehicle on the basis of the sensing data S_data received from the automotive sensor integration module 100.

Although the automotive sensor integration module 100 according to an exemplary embodiment of the present invention is described as receiving the external environmental data EC_data from the upper-level control device 200, the automotive sensor integration module 100 may receive the external environmental data EC_data respectively from a temperature sensor, a humidity sensor, a rain sensor, and a navigation disposed in the vehicle.

The upper-level control device 200 may be a separate device for controlling the automotive sensor integration module 100, or a device included in an autonomous driving system or advanced driver assistance system (ADAS) to identify an object or control driving of a vehicle.

The upper-level control device 200 may identify an object on the basis of the sensing data S_data to which the weight is applied and which is provided from the automotive sensor integration module 100, and control the vehicle driving according to the identification results. Therefore, the upper-level control device 200 may have improved object identification performance.

Here, the automotive sensor integration module 100 and the upper-level control device 200 may be connected via a vehicle network communication. The vehicle network communication technology may include a controller area network (CAN) communication, a local interconnect network (LIN) communication, a flex-ray communication, Ethernet, etc.

FIG. 4 is a view illustrating a configuration of an automotive sensor integration module according to an exemplary embodiment of the present invention.

Referring to FIG. 4, the automotive sensor integration module 100 according to an exemplary embodiment of the present invention may include an optical camera 11, an infrared camera 12, a radar 13, a lidar 14, an interface unit 20, and a signal processor 30. In this case, the interface unit 20 and the signal processor 30 may be implemented as hardware or software on the circuit board shown in FIG. 2.

The optical camera 11 may output information detected through light as first detection data C_s.

The infrared camera 12 may output information detected through infrared rays as second detection data IC_s.

The radar 13 may output information detected through electromagnetic waves as third detection data R_s.

The lidar 14 may output information detected through laser light as fourth detection data L_s.

In this case, the optical camera 11, the infrared camera 12, the radar 13, and the lidar 14 may respectively have different sensing (operation) cycles. For example, the optical camera 11 and the infrared camera 12 may have a sensing cycle of 30 Hz, the radar 13 may have a sensing cycle of 20 Hz, and the lidar 14 may have a sensing cycle of 10 Hz.

Therefore, the optical camera 11 and the infrared camera 12 may output the first and second detection data C_s and IC_s every first time of 33 ms, the radar 13 may output the third detection data R_s every second time of 50 ms and the lidar 14 may output the fourth detection data L_s every third time of 100 ms.

In addition, communication standards of the detection data C_s, IC_s, R_s, and L_s, which are output by the optical camera 11, the infrared camera 12, the radar 13, and the lidar 14, respectively, may be different. For example, the first detection data C_s output by the optical camera 11 may be data of a type used in a low voltage differential signal (LVDS) communication. The second detection data IC_s output by the infrared camera 12 may be data of a type used in a gigabit multimedia serial link (GMSL) communication. The radar 13 and the lidar 14 may be data of a type used in Ethernet.

The interface unit 20 converts the first to fourth detection data C_s, IC_s, R_s, and L_s having different data formats into one predetermined data format and provide converted data C_data to the signal processor 30. The interface unit 20 may convert the format of the first to fourth detection data C_s, IC_s, R_s, and L_s into a data format according to a predetermined communication technology among vehicle network communication technologies.

In this case, the vehicle network communication technologies may include a controller area network (CAN)

communication, a local interconnect network (LIN) communication, a flex-ray communication, Ethernet, etc. For example, the interface unit 20 may convert the first to fourth detection data C_s, IC_s, R_s, and L_s into data of a format according to Ethernet communication.

The signal processor 30 may receive, as the converted data C_data, the first to fourth detection data C_s, IC_s, R_s, and L_s of the same format converted by the interface unit 20.

The signal processor 30 weights the converted data C_data on the basis of the external environment data EC_data and the recognition data OR_data from the upper-level control device 200, and may generate the weighted converted data C_data.

The signal processor 30 may synchronize the first to fourth detection data C_s, IC_s, R_s, and L_s included in the weighted converted data C_data at a predetermined timing to output the resultant data as the sensing data S_data to the upper-level control device 200.

For example, the signal processor 30 may output, as the sensing data S_data, the first to fourth detection data C_s, IC_s, R_s, and L_s at the same timing on the basis of an input timing of one of the weighted first to fourth detection data C_s, IC_s, R_s, and L_s.

For more specific example, the signal processor 30 is configured to receive and store the weighted first to fourth detection data C_s, IC_s, R_s, and L_s, and to output the stored first to fourth detection data C_s, IC_s, R_s, and L_s as the sensing data S_data when a predetermined time has passed after the weighted third detection data R_s was input to the signal processor 30.

In this case, the sensing data S_data may include first to fourth detection data C_s.IC_s, R_s, and L_s acquired from the optical camera 11, the infrared camera 12, the radar 13, and the lidar 14, respectively.

Figure 5:
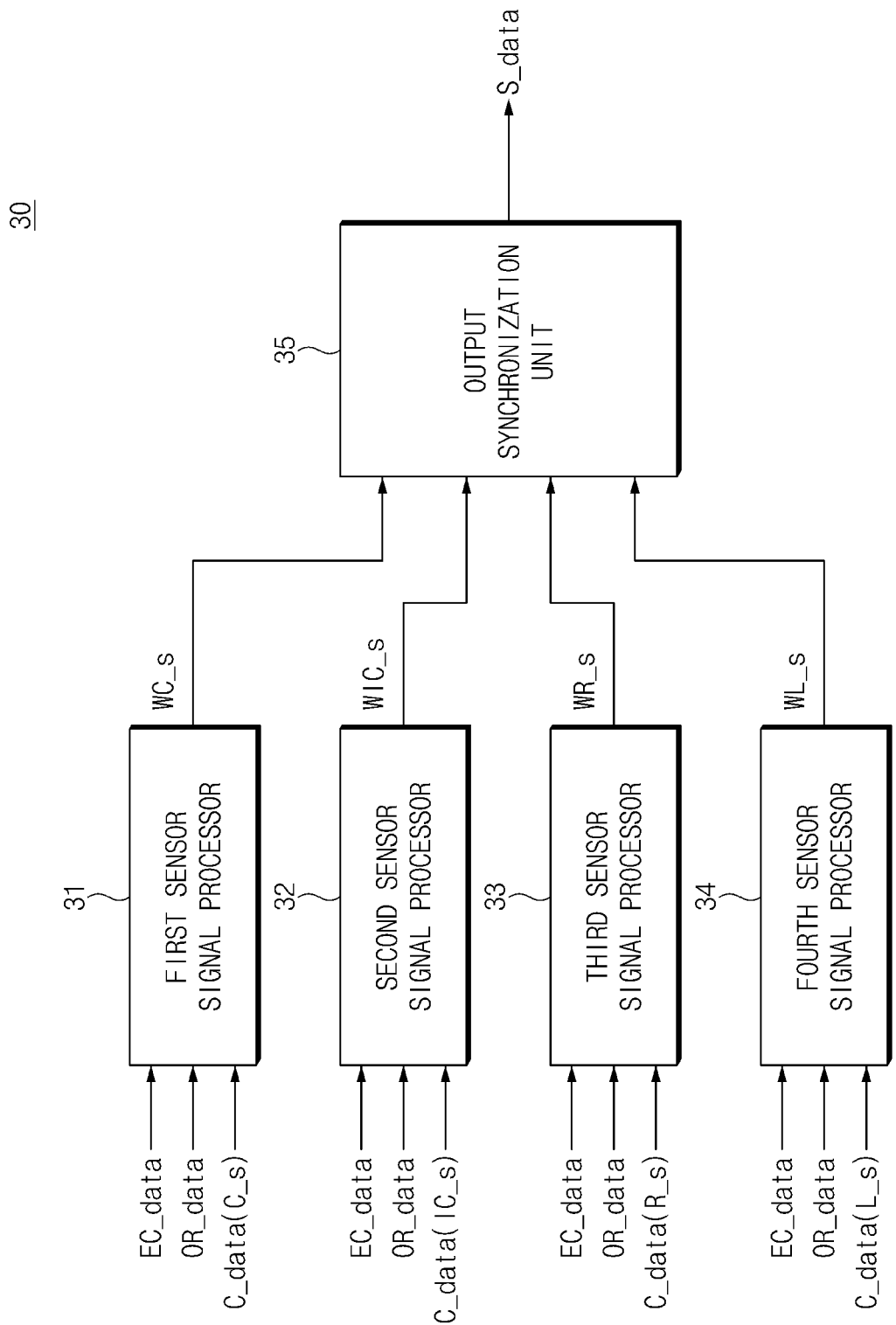
FIG. 5 is a view illustrating a configuration of the signal processor of FIG. 4.

FIG. 5 is a view illustrating a configuration of a signal processor of FIG. 4.

Referring to FIG. 5, the signal processor 30 may include first to fourth sensor signal processors 31, 32, 33, and 34 and an output synchronization unit 35.

The first sensor signal processor 31 may receive the first detection data C_s in which data formats of the external environment data EC_data, the recognition data OR_data, and the converted data C_data are converted and may output a first weighted data WC_s.

For example, the first sensor signal processor 31 may select a weight on the basis of the external environment data EC_data and the recognition data OR_data, and apply the selected weight to the first detection data C_s having converted data type to generate and output the first weighted data WC_s.

The first sensor signal processor 31 receives the first detection data C_s having converted data type, that is, the first detection data C_s output from the optical camera 11.

The optical camera 11 has advantages of being capable of detecting colors and accurately classifying objects compared to other sensors, but has a disadvantage of being greatly affected by environmental factors such as darkness, snow, rain, fog, etc.

Accordingly, the first sensor signal processor 31 may generate, on the basis of the external environment data EC_data, the first weighted data WC_s obtained by applying a lower weight to the first detection data C_s output from the optical camera 11, in the cases of darkness, snow, rain or fog.

On the other hand, the first sensor signal processor 31 may generate, on the basis of the external environmental data EC_data, the first weighted data WC_s obtained by applying a higher weight to the first detection data C_s output from the optical camera 11, in the cases of daytime, no snow, no rain, or no fog.

In addition, since the optical camera 11 has an advantage of being capable of accurately classifying objects, the first sensor signal processor 31 may generate, on the basis of the recognition data OR_data, the first weighted data WC_s in which a greater weight is applied to the first detection data C_s output from the optical camera 11 when a vehicle travels in the city or on a busy road.

Meanwhile, the first sensor signal processor 31 may generate, on the basis of the recognition data OR_data, the first weighted data WC_s in which a lower weight is applied to the first detection data C_s output from the optical camera 11 when a vehicle travels outside the city or on a lightly-traveled road.

The second sensor signal processor 32 may receive the second detection data IC_s in which data formats of the external environment data EC_data, the recognition data OR_data, and the converted data C_data are converted, and output the second weighted data WIC_s.

For example, the second sensor signal processor 32 selects a weight on the basis of the external environment data EC_data and the recognition data OR_data, and applies the selected weight to the second detection data IC_s having converted data format to generate and output the second weighted data WIC_s.

The second sensor signal processor 32 receives the second detection data IC_s having converted data type, that is, the second detection data IC_s output from the infrared camera 12.

The infrared camera 12 has advantages of being capable of long distance detection and of being able to distinguish living things from objects without being affected by environmental factors such as darkness, snow, rain, fog, etc., but has a disadvantage of relatively expensive.

Accordingly, the second sensor signal processor 32 may generate the second weighted data WIC data by applying a constant weight to the second detection data IC_s having converted data type regardless of the external environment data EC_data and the recognition data OR_data.

Meanwhile, the second sensor signal processor 32 may generate, on the basis of the external environment data EC_data and the recognition data OR_data, the second weighted data WIC_s by applying a greater weight to the second detection data IC_s as a weight applied to the first detection data C_s output from the optical camera 11 gets lower.

The third sensor signal processor 33 may receive the third detection data R_s in which data formats of the external environment data EC_data, the recognition data OR_data, and the converted data C_data are converted and may output the third weighted data WR_s.

For example, the third sensor signal processor 33 selects a weight on the basis of the external environment data EC_data and the recognition data OR_data, and applies the selected weight to the third detection data R_s having converted data format to generate and output the third weighted data WR_s.

The third sensor signal processor 33 receives the third detection data R_s having converted data format, that is, the third detection data R_s output from the radar 13.

The radar 13 has an advantage of capable of long distance detection without being affected by environmental factors such as darkness, snow, rain, fog, etc. but has a disadvantage of failing to detect an object which is made of an electromagnetic wave-absorbing material, for example, a steel structure, such as a tunnel or a guardrail and thus, being unable to classify objects.

Accordingly, the third sensor signal processor 33 may generate, on the basis of the recognition data OR_data, the third weighted data WR_s by applying a weight to the third detection data R_s having converted data type, regardless of the external environment data EC_data.

For example, the third sensor signal processor 33 may generate the third weighted data WR_s by applying a lower weight to the third detection data R_s having converted data format when steel structures, such as a tunnel or a guardrail, are present in the vicinity of a vehicle on the basis of the recognition data OR_data.

On the other hand, the third sensor signal processor 33 may apply a greater weight to the third detection data R_s having converted data format when no steel structure, such as a tunnel or a guardrail, is present in the vicinity of a vehicle on the basis of the recognition data OR_data.

The fourth sensor signal processor 34 may receive the fourth detection data L_s in which data formats of the external environment data EC_data, the recognition data OR_data, and the converted data C_data are converted and may output the fourth weighted data WL_s.

For example, the fourth sensor signal processor 34 selects a weight on the basis of the external environment data EC_data and the recognition data OR_data, and applies the selected weight to the fourth detection data L_s having converted data format to generate and output the fourth weighted data WL_s.

The fourth sensor signal processor 34 receives the fourth detection data L_s having converted data type, that is, the fourth detection data L_s output from the lidar 14.

The lidar 14 has advantages of being less affected by environmental factors such as darkness, snow, rain, fog, etc., efficient in long- and short-distance detection due to high resolution, and being capable of performing simple classification of objects, but has a disadvantage of failing to measure the speed of objects immediately.

Therefore, the fourth sensor signal processor 34 may select a weight on the basis of the recognition data OR_data regardless of the external environment data EC_data, and apply the selected weight to the fourth detection data L_s to generate the fourth weighted data WL_s.

To be more specific, the fourth sensor signal processor 34 may select, on the basis of the recognition data OR_data, a higher weight when a vehicle travels in the city or on a busy road, and apply the selected weight to the fourth detection data L_s to generate the fourth weighted data WL_s.

Meanwhile, the fourth sensor signal processor 34 may select, on the basis of the recognition data OR_data, a lower weight when a vehicle travels at a high speed, and apply the selected weight to the fourth detection data L_s to generate the fourth weighted data WL_s.

The output synchronization unit 35 synchronizes and outputs the first to fourth weighted data WC_s, WIC_s, WR_s, and WL_s on the basis of any one of the first to fourth weighted data WC_s, WIC_s, WR_s, and WL_s.

For example, the output synchronization unit 35 may receive and store the first to fourth weighted data WC_s, WIC_s, WR_s, and WL_s, and may output the stored first to fourth weighted data WC_s, WIC_s, WR_s as the sensing data S_data when a predetermined time has passes after any one of the first to fourth weighted data WC_s, WIC_s, WR_s, and WL_s was received.

The first to fourth sensor signal processors 31, 32, 33, and 34, which operate as described above, may be configured in the same manner except that only input and output signals are different. That is, each of the first to fourth sensor signal processors 31, 32, 33, and 34 may select a weight corresponding to advantages and disadvantages of each sensor on the basis of the external environment data EC_data and the recognition data OR_data, and apply the selected weight to each of the detection data C_s, L_s, R_s, and L_s output from each sensor to thereby generate each of the first to fourth weighted data WC_s, WIC_s, WR_s, and WL_s.

Figure 6:
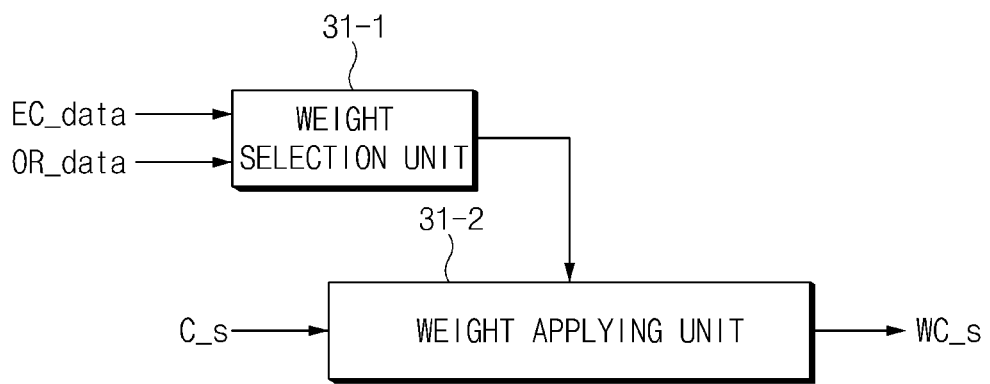
FIG. 6 is a view illustrating a configuration of the first sensor signal processor of FIG. 5.

Accordingly, each of the first to fourth sensor signal processor 31, 32, 33, and 34 may include a weight selection unit 31-1 and a weight applying unit 31-2 as shown in FIG. 6.

Therefore, the description for the configuration of the first sensor signal processor 31 applies to the remaining second to fourth sensor signal processors 32, 33 and 34.

FIG. 6 is a view illustrating a configuration of the first sensor signal processor illustrated in FIG. 5.

Referring to FIG. 6, the first sensor signal processor 31 may include the weight selection unit 31-1 and the weight applying unit 31-2.

The weight selection unit 31-1 may select a weight corresponding to advantages and disadvantages of the optical camera 11 on the basis of the external environment data EC_data and the recognition data OR_data.

For example, the weight selection unit 31-1 may select, on the basis of the external environment data EC_data, a relatively greater weight in the daytime than in the darkness.

In addition, the weight selection unit 31-1 may select, on the basis of the external environment data EC_data, a relatively higher weight for no snow or no rain than for snow or rain.

Likewise, the weight selection unit 31-1 may select a relatively higher weight for no fog than for fog on the basis of the external environment data EC_data.

In addition, the weight selection unit 31-1 may select, on the basis of the recognition data OR_data, a lower weight when a vehicle travels outside the city or on a lightly-traveled road than when the vehicle travels in the city or on a busy road.

The weight applying unit 31-2 may generate the first weighted data WC_s by applying the selected weight output from the weight selection unit 31-1 to the first detection data C_s which is output from the optical camera 11 and the data type of which is converted.

As described above, the automotive sensor integration module 100 according to the present invention applies weights corresponding to advantages and disadvantages of each sensor to each of the detection data C_s, IC_s, R_s and L_s output from the optical camera 11, the infrared camera 12, the radar 13, and the lidar 14 on the basis of the external environmental data EC_data and the recognitive data OR_data to generate the first to fourth weighted data WC_s, WIC_s, WR_s, and WL_s and synchronizes the first to fourth weighted data WC_s, WIC_s, WR_s, and WL_s on the basis of one of the generated first to fourth weighted data WC_s, WIC_s, WR_s, and WL_s to provide the resultant data to the upper-level control device 200, thereby improving the object identification performance of the autonomous driving system or the ADAS system to which the automotive sensor integration module 100 according to the inventive concepts is applied.

An automotive sensor integration module according to an embodiment of the present invention is operated by a plurality of sensors being synchronized, thereby improving performance of detecting an object outside a vehicle.

In addition, an automotive sensor integration module according to an exemplary embodiment of the present invention determines the reliability of detection data of each of a plurality of sensors, thereby improving performance of detecting an object outside the vehicle.

Although the inventive concepts have been described with reference to the drawings exemplified as above, the inventive concepts are not limited to the embodiments and drawings disclosed herein, and it would be obvious that various modifications may be made by those skilled in the art within the scope of the technical spirit of the present invention. Furthermore, it is apparent that, although the effects brought about by the configuration of the present invention are not clearly mentioned while describing the embodiments of the present invention, any effect, which can be predicted from the configuration, can also be acknowledged.

What is claimed is:

1. An automotive sensor integration module, comprising:
   a circuit board;
   a first sensor provided on the circuit board and configured to obtain first detection data based on a first sensing cycle;
   a second sensor provided on the circuit board and configured to obtain second detection data based on a second sensing cycle; and
   a signal processor configured to synchronously output the first detection data and the second detection data, as sensing data, to an upper-level control device to detect at least one object,
   wherein the signal processor is further configured to:
   select a first weight for the first sensor and a second weight for the second sensor on the basis of at least one of external environment data and recognition data,
   generate first weighted data by applying the first weight to the first detection data and generate second weighted data by applying the second weight to the second detection data, and
   output the first weighted data and the second weighted data as the sensing data to the upper-level control device to detect at least one object.

2. The automotive sensor integration module of claim 1, wherein the signal processor stores the first weighted data and the second weighted data and simultaneously outputs the stored first weighted data and the stored second weighted data as sensing data on the basis of a predetermined time.

3. The automotive sensor integration module of claim 1, wherein the external environment data comprises information on at least one among daytime, darkness, snow, rain, and fog.

4. The automotive sensor integration module of claim 1, wherein the recognition data comprises results of identifying objects within a predetermined distance from a vehicle on the basis of the sensing data.

5. The automotive sensor integration module of claim 1, wherein:
   the first sensor comprises at least one among an optical camera, an infrared camera, a radar, and a lidar; and
   the second sensor comprises at least one among an optical camera, an infrared camera, a radar, and a lidar.

6. The automotive sensor integration module of claim 5, wherein:
   the signal processor, on the basis of the external environment data, selects a greater weight for daytime than for darkness, selects a greater weight for no snow or no rain than for snow or rain, and selects a greater weight for no fog than for fog; and
   the signal processor applies a selected weight to detection data output from the optical camera.

7. The automotive sensor integration module of claim 5, wherein the signal processor, on the basis of the recognition data, selects a lower weight when a steel structure is within a predetermined distance from a vehicle than when there is no steel structure within a predetermined distance from the vehicle, and applies a selected weight to detection data output from the radar.

8. A method for detecting at least one object using an automotive sensor integration module comprising a circuit board, a first sensor provided on the circuit board and configured to obtain first detection data based on a first sensing cycle, a second sensor provided on the circuit board and configured to obtain second detection data based on a second sensing cycle, and a signal processor configured to synchronously output the first detection data and the second detection data, as sensing data, to an upper-level control device, the method comprising:
   selecting, by the signal processor, a first weight for the first sensor and a second weight for the second sensor on the basis of at least one of external environment data and recognition data,
   generating, by the signal processor, first weighted data by applying the first weight to the first detection data and second weighted data by applying the second weight to the second detection data, and
   outputting, by the signal processor, the first weighted data and the second weighted data as the sensing data to the upper-level control device to detect at least one object.

9. The method of claim 8, wherein the outputting the first weighted data and the second weighted data as the sensing data to the upper-level control device includes:
   storing, by the signal processor, the first weighted data and the second weighted data; and
   simultaneously outputting, by the signal processor, the stored first weighted data and the second weighted data as sensing data on the basis of a predetermined time.

10. The method of claim 8, wherein the external environment data comprises information on at least one among daytime, darkness, snow, rain, and fog.

11. The method of claim 8, wherein the recognition data comprises results of identifying objects within a predetermined distance from a vehicle on the basis of the sensing data.

12. The method of claim 8, wherein:
   the first sensor comprises at least one among an optical camera, an infrared camera, a radar, and a lidar; and
   the second sensor comprises at least one among an optical camera, an infrared camera, a radar, and a lidar.

13. The method of claim 12, further comprising:
   on the basis of the external environment data, selecting, by the signal processor, a greater weight for daytime than for darkness, selecting, by the signal processor, a greater weight for no snow or no rain than for snow or rain, and selecting, by the signal processor, a greater weight for no fog than for fog; and
   applying, by the signal processor, a selected weight to detection data output from the optical camera.

* * * * *